United States Patent [19]
Tierce

[11] 3,979,060
[45] Sept. 7, 1976

[54] AUTOMATIC MULTIPLE UNIT CONTROL APPARATUS

[76] Inventor: James Allen Tierce, 723 Melrose St., Richardson, Tex. 75080

[22] Filed: Mar. 20, 1975

[21] Appl. No.: 560,156

[52] U.S. Cl. .............................. 236/46 R; 165/12; 219/486
[51] Int. Cl.² ..................... F23N 5/20; G05D 23/00
[58] Field of Search ................. 236/46, 1 B; 62/231, 62/158; 165/12; 219/492, 486

[56] References Cited
UNITED STATES PATENTS

| | | | |
|---|---|---|---|
| 2,244,584 | 6/1941 | Turner | 236/46 |
| 2,958,755 | 11/1960 | Miller | 219/486 X |
| 3,046,380 | 7/1962 | Carlson | 219/486 X |
| 3,444,391 | 5/1969 | Smith | 62/231 X |

*Primary Examiner*—William E. Wayner
*Attorney, Agent, or Firm*—Warren H. Kintzinger

[57] ABSTRACT

Control apparatus for automatically enabling and disabling the thermostatic control of a plurality of building temperature control units. A programmable timer is provided for adapting the control apparatus to a desired building use schedule. A manually operable override switch is also provided to allow for temperature control during unscheduled building occupancies and additional circuitry automatically disables the override switch to prevent the control apparatus from remaining overridden for an extended period of time in the event the override switch is not reset. A temperature limit switch is further provided to return the temperature control units to thermostatic control if the building temperature drifts outside a predetermined range during periods of disablement.

7 Claims, 1 Drawing Figure

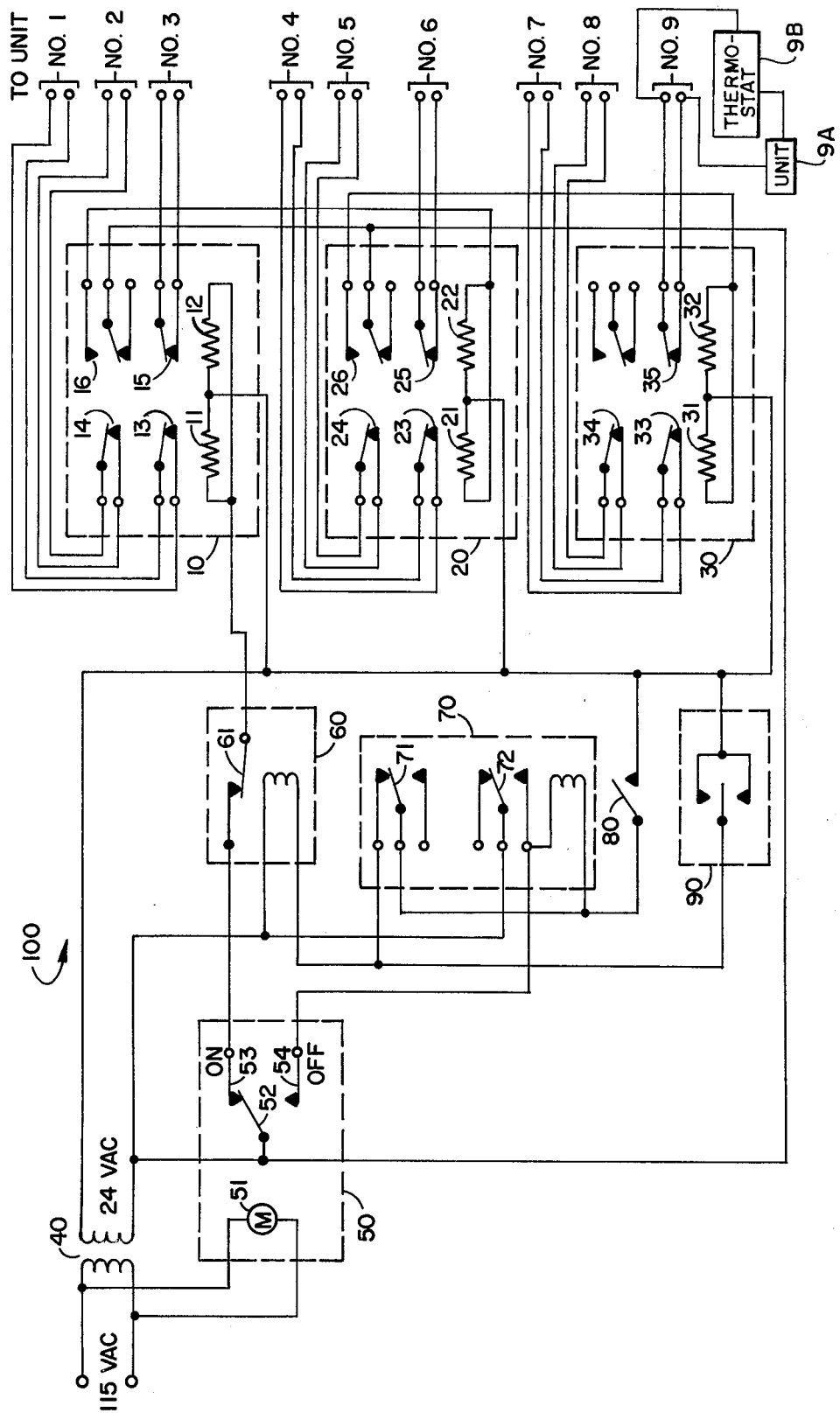

AUTOMATIC MULTIPLE UNIT CONTROL APPARATUS

This invention relates in general to automatic control apparatus and, in particular to energy conserving control apparatus for use with building temperature control units such as air conditioning and/or heating units.

Many large commercial and industrial buildings are occupied only part time and on a regular schedule. For example, a department store may be open 10 a.m. to 9 p.m. 5 days a week, from 10 a.m. to 6 p.m. on the 6th day, and closed on the 7th day. Such buildings are typically of a size to require a plurality of thermostatically controlled heating and/or air conditioning units for maintaining the building temperature at a suitable level for human comfort during periods of occupancy. For economic reasons it is desirable during unoccupied periods to decontrol the temperature control units to a certain extent. In many instances the temperature control units cannot be completely decontrolled, however, in order to prevent possible inventory or building damage such as, for example, the freezing and subsequent bursting of water lines.

It is, therefore, a principal object of this invention to provide programmable control apparatus for a plurality of temperature control units that automatically switch from a thermostatically controlled state during scheduled periods of occupancy, to a partially decontrolled state during unoccupied periods.

It is a further object to provide a manual override capability in the event of an unscheduled occupancy.

A still further object is to provide circuitry for automatically disabling the override capability after a predetermined time to prevent the control apparatus from being overridden for several days at a time.

Another object is to provide for a staggered turn-on of a plurality of temperature control units so as to prevent a power surge which might cause a power overload failure.

It is still another object to provide a fail-safe control system which returns the temperature control units to individual thermostatic control in the event of a control system malfunction.

Features of the invention useful in accomplishing the above objects include a programmable timer for switching the temperature control units between a thermostatically controlled state during periods of building occupancy and an extreme temperature limit switch controlled state during unoccupied periods. A plurality of chain-connected time delay relays are sequentially enabled to provide for a staggered turn-on or turn-off of the temperature control units in response to the state of the timer. The contacts of these relays are arranged in a "normally closed" configuration in series with the individual thermostats of the temperature control units so that fail-safe operation is insured. A manual override switch allows for unscheduled thermostatic control of the temperature control units and circuitry is provided to automatically disable the override switch whenever the timer automatically switches the system to the thermostatically controlled state.

A specific illustrative embodiment representing what is presently regarded as the best mode of carrying out the invention is illustrated in the single accompanying drawing figure which depicts a schematic diagram of circuitry embodying the principles of this invention for controlling the operation of a plurality of temperature control units in accordance with the foregoing objects and features.

Referring to the drawing:

For purposes of illustration, control apparatus 100 is shown connected between a source of 115 volt 60 cycle AC and nine temperature control units. The temperature control units may be heaters and/or air conditioners, the connections thereto actually being made in series with the control lines from the individual thermostats to the respective temperature control units. These connections are made through normally closed contact pairs of time delay relays 10, 20 and 30 as typically depicted in the drawing for a temperature control unit 9A and associated thermostat 9B through normally closed contact pair 35 of time delay relay 30. Therefore, in the event of a malfunction of control apparatus 100, temperature control units 1 through 9 would remain under, or revert to, the control of their respective thermostats. It is expressly understood that nine temperature control unit connections have been shown for illustrative purposes only. The exemplary embodiment may be expanded to control many more units or reduced to control fewer. Additionally, the principles of this invention allow for the exemplary embodiment to be modified to control such other functions as lighting, factory machinery, etc., without departing from the spirit and scope of the invention.

Transformer 40 converts the 115 volt 60 cycle AC from a standard wall outlet into 24 volt 60 cycle AC for operating the relays in control apparatus 100. Other voltages and frequencies may be utilized in the event it is so desired. The line voltage is applied directly to motor 51 of timer 50. Timer 50 is a programmable timer and may be of the 7 day or 24 hour variety. Such a timer typically comprises a contact 52 which is rotated by motor 51. ON contact 53 and OFF contact 54 may be programmed to be alternately engaged with contact 52 during predetermined periods of the 7 day or 24 hour period. Programmable timer 50 may be of any commercially available variety that satisfies the requirements of any particular application of this invention.

When motor 51 moves contact 52 into engagement with ON contact 53, temperature control units 1 through 9 are removed from the control of their respective thermostats as follows. Twenty-four volts is applied to heaters 11 and 12 of time delay relay 10 over the path comprising contacts 52 and 53 of timer 50 and normally closed contact pair 61 of relay 60. Time delay relays 10, 20 and 30 may illustratively be of the type manufactured by Texas Instruments and known by the name KLIXON. Other bistable devices with suitable delays, such as solid state delay flip-flops may be substituted for the time delay relays if the specific application permits. After a suitable time delay, normally closed contact pairs 13, 14 and 15 open the series connections of temperature control units 1, 2 and 3, respectively, with their respective thermostats. At this same time, normally open contact pair 16 is closed. This completes a path for heaters 21 and 22 of time delay relay 20 to the 24 volt supply. After a delay period, normally closed contact pairs 23, 24 and 25 open the series connections of temperature control units 4, 5 and 6, respectively, with their respective thermostats. At this same time, normally open contact pair 26 is closed. This completes a path for heaters 31 and 32 of time delay relay 30 to the 24 volt supply. After a delay period, normally closed contact pairs 33, 34 and 35 open the series connections of temperature control units 7,8 and 9, respectively, with their respective thermostats. Thus, all temperature control units are disabled in a staggered manner.

In order to prevent the building temperature from being either too high or too low when the temperature control units 1 through 9 are disabled, temperature limit switch 90 is provided. Temperature limit switch 90 is arranged to complete an energizing path for relay 60 if the ambient temperature of the building falls below or rises above predetermined temperature limits. For example, temperature limit switch 90 may be set to close the path when the building temperature drops below 45° or rises above 95°. If either of these events occurs and temperature limit switch completes an energizing path for relay 60, normally closed contact pair 61 opens and de-energizes heaters 11 and 12 of time delay relay 10. After a delay period, contact pairs 13, 14 and 15 close, placing temperature control units 1,2 and 3, respectively, under the control of their respective thermostats. Contact pair 16 opens, de-energizing heaters 21 and 22 of time delay relay 20. After a delay period, contact pairs 23, 24 and 25 close, placing temperature control units 4,5 and 6, respectively, under the control of their respective thermostats. Contact pair 26 opens, deenergizing heaters 31 and 32 of time delay relay 30. After a delay period, contact pairs 33, 34 and 35 close, placing temperature control units 7,8 and 9, respectively, under the control of their respective thermostats. The building is then either heated or cooled, as the case may be, until temperature limit switch 90 opens the energizing path of relay 60. This opening will occur when the temperature changes by some predetermined amount, for example three degrees. Contact pair 61 then closes, causing the staggered energization of time delay relays 10, 20 and 30 and the subsequent disabling of temperature control units 1 through 9, as heretofore described. It is thus seen that whenever temperature control units 1 through 9 are either enabled or disabled, it is in a staggered manner so as not to create a damaging power surge.

When motor 51 moves contact 52 into engagement with OFF contact 54, power is removed from heaters 11 and 12 of time delay relay 10. This causes control of temperature control units 1 through 9 to revert to their respective thermostats in the staggered manner described above.

Override switch 80 is provided so that in the event of an unscheduled occupancy of the building, the temperature control units 1 through 9 may revert to the control of their respective thermostats in order to make the building temperature suitable for human occupancy. With timer 50 in the ON state, if a person enters the building and desires to enable the temperature control units 1 through 9, he or she would close override switch 80. This provides an energization path for relay 60 through normally closed contact pair 71 of relay 70. The energization of relay 60 would open normally closed contact pair 61, removing power from heaters 11 and 12 of time delay relay 10. As described above, this causes the temperature control units 1 through 9 to revert to the control of their respective thermostats in a staggered manner. When override switch 80 is opened, relay 60 is deenergized and time delay relays 10, 20 and 30 operate to remove control of temperature control units 1 through 9 from their respective thermostats.

In the event the override switch 80 were not opened, control apparatus 100 could be disabled for days until someone eventually opened switch 80. To prevent this from occurring, relay 70 is provided in circuit configuration to bypass switch 80 the next time timer 50 goes into its OFF state. With switch 80 closed, when contact 52 engages OFF contact 54, an energization path is completed for relay 70. Relay 70 locks up through normally open contact pair 72 and closed switch 80. Normally closed contact pair 71 opens and removes switch 80 from the energization path of relay 60. The status of temperature control units 1 through 9 remains the same, that is they are under the control of their respective thermostats. However, the next time contact 52 engages ON contact 53, temperature control units 1 through 9 may be removed from the control of their respective thermostats even though switch 80 is still closed. This is because relay 70 remains energized and keeps open the energization path of relay 60 which includes switch 80. Switch 80 can have no further effect on control apparatus 100 until it is first opened. When this occurs, relay 70 is de-energized, returning normally closed contact pair 71 to its closed state, thereby returning the energization of relay 60 to the control of switch 80. A subsequent closure of override switch 80 when timer 50 is in its OFF state will return the control of temperature control units 1 through 9 to their respective thermostats.

There has thus been described apparatus for controlling a plurality of energy consuming devices in a programmable and economical manner. The apparatus is fail-safe in that in the event of a malfunction, control of the devices automatically reverts back to the individual devices. There is also the provision of a manual override capability and an automatic disabling of this capability.

Whereas this invention is herein illustrated and described with respect to a specific embodiment thereof, it should be realized that various changes may be made without departing from the essential contributions to the art made by the teachings hereof.

I claim:

1. Apparatus for controlling a plurality of devices to be alternately enabled and disabled during predetermined cyclically recurring time periods including: two state programmable timer means arranged to be in a first of its states during those of said time periods when said plurality of devices are to be enabled and in the second of its states during those of said time periods when said plurality of devices are to be disabled; a plurality of bistable elements connected in chain-like configuration to said timer means so as to sequentially switch in a predetermined order from their first states to their second states responsive to said timer means changing from its first state to its second state and to sequentially switch in said predetermined order from their second states to their first states responsive to said timer means changing from its second state to its first state, said bistable elements including delay means so that the sequential switching is spread out over a predetermined period of time; switch means operatively connecting said plurality of devices to respective ones of said plurality of bistable elements so as to enable each of said devices when its respective bistable element is in its first state and to disable each of said devices when its respective bistable element is in its second state; manually operable override switch means for providing an indication that said devices are to be enabled; override enabling means connected to said override switch means and responsive to said indication for switching said bistable elements to their first states; override disabling means interposed between said override switch means and said override enabling means, said override disabling means being responsive to said indication from said override switch means and to said timer means changing to its first state for opening the connection between said override switch means and said override enabling means, and said override disabling means being further responsive to a subsequent termination of said indication from said override switch means for closing the connection between said override switch means and said override enabling means.

2. The apparatus of claim 1, wherein said devices are thermostatically responsive temperature control units including control wires connecting each of said units to a respective thermostat through said switch means and said switch means is arranged to disconnect respective thermostats from respective units when the respective bistable elements are in their second state and to connect respective thermostats to respective units when the respective bistable elements are in their first state.

3. The apparatus of claim 2, further including: temperature limit switch means providing an indication of a temperature outside a predetermined range; and means responsive to said indication for switching said bistable elements to their first states.

4. Apparatus for controlling a plurality of devices to be alternately enabled and disabled during predetermined cyclically recurring time periods including: two state programmable timer means arranged to be in a first of its states during those of said time periods when said plurality of devices are to be enabled and in the second of its states during those of said time periods when said plurality of devices are to be disabled; a plurality of bistable elements connected in chain-like configuration to said timer means so as to sequentially switch in a predetermined order from their first states to their second states responsive to said timer means changing from its first state to its second state and to sequentially switch in said predetermined order from their second states to their first states responsive to said timer means changing from its second state to its first state, said bistable elements including delay means so that the sequential switching is spread out over a predetermined period of time; and switch means operatively connecting said plurality of devices to respective ones of said plurality of bistable elements so as to enable each of said devices when its respective bistable element is in its first state and to disable each of said devices when its respective bistable element is in its second state; said bistable elements comprising time delay relays and said switch means comprising normally closed contact pairs of respective ones of said time delay relays.

5. Apparatus for enabling and disabling the thermostatic control of a plurality of building temperature control units according to a predetermined and programmable cyclically recurring schedule including: a programmable timer providing a signal along a first path during time periods of enablement and along a second path during time periods of disablement; and a plurality of time delay relays each having a slow acting energization element and a plurality of normally closed contact pairs, the thermostat control wires of each of said temperature control units being serially connected to a respective one of said normally closed contact pairs, the energization element of a first of said time delay relays being connected to said second path, said first time delay relay having a normally open contact pair connected to an energization path for a second of said time delay relays, said second time delay relay having a normally open contact pair connected to an energization path for a third of said time delay relays, etc., whereby the energization or de-energization of said first time delay relay causes a sequential and staggered energization or de-energization, respectively, of said plurality of time delay relays and a corresponding disablement or enablement, respectively, of the thermostatic control of said plurality of temperature control devices; a first relay having a normally closed contact pair serially connected in said second path; and a temperature limit switch serially connected to the energization element of said first relay, said temperature limit switch closing when the building temperature varies outside a predetermined range.

6. The apparatus of claim 5, further including a manually operable override switch serially connected to said energization element of said first relay in a path parallel to said temperature limit switch.

7. The apparatus of claim 6, further including a second relay having a normally closed contact pair serially connected between said override switch and the energization element of said first relay, the energization element of said second relay being serially connected between said first path and said override switch, said second relay having a normally open contact pair connected to lock, in an energized state, said second relay until said override switch is opened.

* * * * *